United States Patent
Amano et al.

[11] Patent Number: 5,672,377
[45] Date of Patent: Sep. 30, 1997

[54] METHOD OF FORMING A SOLID ELECTROLYTIC CAPACITOR

[75] Inventors: Kosuke Amano; Hitoshi Ishikawa; Atsushi Kobayashi; Masaharu Satoh, all of Tokyo, Japan

[73] Assignee: NEC Corporation, Tokyo, Japan

[21] Appl. No.: 621,329

[22] Filed: Mar. 25, 1996

Related U.S. Application Data

[63] Continuation of Ser. No. 169,982, Dec. 16, 1993, abandoned.

[30] Foreign Application Priority Data

Dec. 17, 1992 [JP] Japan .................... 4-336865

[51] Int. Cl.$^6$ ..................... B05D 5/12
[52] U.S. Cl. ............ 427/80; 427/307; 427/402
[58] Field of Search ............... 427/80, 307, 402

[56] References Cited

U.S. PATENT DOCUMENTS

| | | | |
|---|---|---|---|
| 4,769,115 | 9/1988 | Satoh et al. | 204/59 R |
| 4,780,796 | 10/1988 | Fukuda et al. | 361/433 |
| 5,017,272 | 5/1991 | Kamigawa | 204/56.1 |
| 5,019,949 | 5/1991 | Ikeda et al. | 361/525 |
| 5,130,886 | 7/1992 | Kishimoto et al. | 361/525 |
| 5,135,618 | 8/1992 | Saiki et al. | 205/171 |
| 5,376,728 | 12/1994 | Patil et al. | 525/274 |
| 5,422,194 | 6/1995 | Satoh et al. | 428/704 |
| 5,586,001 | 12/1996 | Amano et al. | 361/525 |

OTHER PUBLICATIONS

"Soluble Polyaniline", by S. Li et al., *Synthetic Metals*, vol. 20, Jan. 6, 1987, pp. 141–147.

"Thermal Stability of Polyaniline Tosylate", by V.G. Kulkarni et al., Synthetic metals, vol. 41, 1991, pp. 1009–1012.

"Polaron Lattice in Highly Conducting Polyaniline: Theoretical and Optical Studies" by S. Stafstrom et al., *Physical Review Letters*, vol. 59, No. 13, Sep. 28, 1987, pp. 1464–1467.

*Primary Examiner*—Benjamin Utech
*Attorney, Agent, or Firm*—Young & Thompson

[57] ABSTRACT

A process for the preparation of polyaniline by an oxidation polymerization of aniline with use of an oxidizing agent and a protonic acid, wherein the pKa value of a byproduct produced by the reduction of the oxidizing agent is greater than the pKa value of the protonic acid. The protonic acid is an aromatic sulfonic acid compound having at least a sulfonic-acid group. A process is also provided for the formation of a solid electrolytic capacitor including an electrolyte of the polyaniline. A method is provided of improving the electrical conductivity of the polyaniline prepared by the above process. The polyaniline is subjected to a heat treatment in a vacuum or an inert gas in which a partial pressure of oxygen is 10 mmHg or below.

2 Claims, 3 Drawing Sheets

METHOD OF FORMING A SOLID ELECTROLYTIC CAPACITOR

This application is a continuation of application Ser. No. 08/169,982, filed Dec. 16, 1993, now abandoned.

BACKGROUND OF THE INVENTION

The invention relates to a method of preparing a polyaniline and its derivatives for electronic devices, a method of improving the conductivity thereof and a method of forming a solid electrolytic capacitor including the same.

Down sizing and improvement in reliability of such devices have been required, a solid electrolytic capacitor is then sought to have a large capacitance and excellent properties in high frequency range.

The solid electrolytic capacitor may be provided with a first electrode serving as an anode, and a dielectric and a second electrode serving as a cathode. The anode may commonly comprise porous tantalum pellets or an aluminum foil. The dielectric is formed on the anode surface by anodized tantalum or tantalum aluminium. The cathode may include a solid electrolyte such as manganese dioxide ($MnO_2$) and 7,7',8,8'-tetracyanoquinodimethane (TCNQ) complex salts and the like. The solid electrolyte is sought to have capabilities of not only electrical connections between entire surface of a dielectric within the porous pellets and leads of the electrodes but also repairing an electrical short caused by defects of a dielectric film. Thus, a metal showing a high conductivity but no performance of repairing the dielectric is not useful as the solid electrolyte. Then, manganese dioxide ($MnO_2$) and the like which performs as an insulator when receipt of heat due to a short circuit current have been used. The solid electrolytic capacitor provided with the electrode including manganese dioxide ($MnO_2$) show a high impedance of the capacitor in high frequency range. This results in a low conductivity of $MnO_2$. While the state electrolytic capacitor provided with an electrode including tetracyanoquinodimethane complex salts has been used, the same seems not suitable as its poor heat resistivity because tetracyanoquinodimethane complex salts often show a heat decomposition.

Recently, developments in novel materials have been successful in a technical field of polymers. The results of the development has provided novel conductive polymers prepared by doping conjugate polymers with a dopant serving as electron donor or electron acceptor in which the conjugate polymer may be polyacetylene, polyparaphenylene, polypyrrole and polyaniline and the like. Polypyrrole shows a high conductivity and a high stability on heating, for which reason polypyrrole has been used as a solid electrolyte for the solid electrolytic capacitor. On the other hand, polyaniline not only shows such a high conductivity as that of polypyrrole but also seems inexpensive rather than polypyrrole and further shows a superior stability on heating in air. Accordingly, polyaniline is useful for the solid electrolytic capacitor.

Conventional methods of preparing polyaniline will hereinafter be described. Polyaniline may be prepared by oxidation of aniline in protonic acid solution. Two methods of preparation of polyaniline have been known in the prior arts. First is an electrochemical polymerization of aniline in an acid solution. Second is a chemical oxidizing polymerization of aniline by adding an oxidizing agent into a soluble solution containing protonic acid.

In the chemical oxidizing polymerization method, it is necessary to select proton acids to be used in synthesizing process, which show such a large dissociation constant as to permit an ionic bond with polyaniline structure. Ammonium peroxodisulfate, dichromate, hydrogen peroxide and ferric chloride and the like are useful as the oxidizing agents. For example, a polymerization process using both aromatic sulfonic acid as the proton acid and ammonium peroxodisulfate as the oxidizing agent was reported in "1987 Synthetic Metals Vol. 20, p. 141". It was also reported in "1991 Synthetic Metals Vol. 41, p. 1009" that an polyaniline doped with paratoluene sulfonic acid shows an excellent thermal stability.

In addition, a possible improvement in conductivity of polyaniline is a material issue. A molecular structural rearrangement by protonation of polyaniline is disclosed in "1987 Physical Review Letters, Vol. 59, p. 1464". The conductivity of polyaniline generally depends upon an amount of the dopant as protonated ion-pairs. A polyaniline prepared by electrochemical polymerization has a sufficient amount of dopant, but is applicable to conductive materials only. In contrast, a polyaniline prepared by the chemical oxidizing polymerization is applicable to not only conductive materials but also other materials, however requires an acid treatment by protonic acid of a polyaniline formed on an electronic device because of a less amount of doping to the polyaniline as compared to that prepared by the electrochemical polymerization. Accordingly, the applicability of the polyaniline prepared by the chemical oxidizing polymerization is necessarily limited to an electronic device material showing an protonic acid resistivity.

As described above, polypyrrole has been useful in the prior arts as a solid electrolyte to provide a solid electrolytic capacitor which possesses excellent properties in high frequency and stability on heating. Polypyrrole has, however, disadvantages in complication of processes for preparation thereof and its high expenditure. So it is important to provide a useful polyaniline as the electrolyte for the capacitor.

SUMMARY OF THE INVENTION

Accordingly, it is a primary object of the present invention to provide a process of preparing polyaniline and its derivatives free from the above problems.

It is a further object of the present invention to provide a novel process of preparing polyaniline and its derivatives useful as an electrolytic material for a solid electrolytic capacitor.

It is a further more object of the present invention to provide a novel process of preparing polyaniline showing a high conductivity.

It is a still further object of the present invention to provide a novel process of preparing polyaniline showing an excellent heat resistivity.

It is yet a further object of the present invention to provide a novel process of preparing polyaniline permitting a solid electrolytic capacitor to possess a high reliability.

It is another object of the present invention to provide a novel process of preparing polyaniline permitting a solid electrolytic capacitor to show excellent properties in high frequency range.

It is still another object of the present invention to provide a method of improving a conductivity of polyaniline useful as an electrolytic material for a solid electrolytic capacitor.

It is an additional object of the present invention to provide a method of forming a solid electrolytic capacitor using an improved polyaniline as a solid electrolyte.

The above and other objects, features and advantages of the present invention will be apparent from the following descriptions.

The present invention provides a method for the preparation of polyaniline by an oxidation polymerization of aniline or its derivatives with use of an oxidizing agent and a proton acid, wherein a pKa value of a byproduct produced by a reduction of said oxidizing agent is greater than a pKa value of the proton acid. The proton acid is a sulfonic acid compound having at least a sulfonic acid group. Dichromate is available as the oxidizing agent.

The present invention also provides a method for forming a solid electrolytic capacitor. A dielectric film is formed by anodizing anode metal on a first electrode. A polyaniline as an electrolyte is prepared by an oxidation polymerization of aniline with use of an oxidizing agent and a proton acid in which a pKa value of a byproduct produced by a reduction of the oxidizing agent is greater than a pKa value of the proton acid. The proton acid is a sulfonic acid compound having at least a sulfonic acid group. After the polymerization, the oxidizing byproduct produced by the agent and an excess proton acid may be removed.

The present invention also provides a method of improving an electrical conductivity of a polyaniline. The polyaniline is prepared by an oxidation polymerization of aniline with use of an oxidizing agent and a proton acid in which a pKa value of a byproduct produced by a reduction of the oxidizing agent is greater than a pKa value of the proton acid. The polyaniline prepared is subjected to a heat treatment in a vacuum or an inert gas in which a partial pressure of oxygen is 10 mmHg or below.

BRIEF DESCRIPTION OF THE DRAWINGS

Preferred embodiments of the invention will hereinafter fully be described in detail with reference to the accompanying drawings.

EMBODIMENTS

To achieve the above objects of the present invention, a polymerization of polyaniline in which sulfonic acid is used as a dopant was considered. It was confirmed that when sulfonic acid and ammonium persulfate are used as a proton acid and an oxidizing agent respectively for the chemical oxidation polymerization of polyaniline, a dopant doped into the polymerized polyaniline is not sulfonic acid as the proton acid to be added into a system but it is sulfuric acid produced by a reduction of ammonium persulfate.

Polyaniline prepared by redoping a neutral polyaniline with sulfonic acid shows an excellent thermal stability. But polyaniline prepared by a chemical oxidation polymerization using sulfonic acid as a proton acid and ammonium persulfate as an oxidizing agent shows a poor thermal stability. Accordingly, polyaniline doped with sulfonic acid shows a superior thermal stability. In the prior art, it has not yet been known that such polyaniline may be prepared by a direct chemical oxidation polymerization.

It was also confirmed that conditions to achieve the above objects are that the proton acid has a lower pKa value than a pKa value of byproduct produced by a reduction process of the oxidizing agent.

When ammonium persulfate is used as the oxidizing agent, the reduction reaction of the oxidizing agent is accomplished as follows.

$$(NH_4)_2S_2O_8 + 2e^- \rightarrow (NH_4)_2SO_4 + SO_4^{2-}$$ (Formula 1)

In this case, since $SO_4^{2-}$ as byproduct produced from the oxidizing agent has a lower pKa value than that of sulfonic acid, $SO_4^{2-}$ serves as a dopant to be doped into polyaniline.

When ferric chloride is used as the oxidizing agent, the reduction reaction of the oxidizing agent is accomplished as follows.

$$FeCl_3 + e^- \rightarrow FeCl_2 + Cl^-$$ (Formula 2)

In this case, since $Cl^-$ as byproduct produced from the oxidizing agent has a lower pKa value than that of sulfonic acid, $Cl^-$ having a facility of dedoping at a high temperature may serve as a dopant to be doped into polyaniline. The resultant polyaniline has a poor thermal stability.

A polymerization of polyaniline using an oxidizing agent in the oxidizing process for aniline is considered in which a byproduct produced from the reduction of the has a lower pKa value than that of sulfonic acid. When ammonium dichromate is used as the oxidizing agent, the oxidation processes are accomplished as follows.

$$Na_2Cr_2O_7 + 14H^+ + 6e^- \rightarrow 2Cr^{3+} + 2Na^+ + 7H_2O$$ (Formula 3)

In this case, since byproducts produced from the oxidizing agent have a larger pKa value than that of sulfonic acid, sulfonic acid may serve as a dopant as the proton acid to be doped into polyaniline. The resultant polyaniline shows an excellent thermal stability and thus is very useful as a solid electrolyte to be formed on an oxide film for a solid electrolytic capacitor.

According to the present invention, an sulfonic acid compound is used as the proton acid in which the sulfonic acid compound has at least one sulfonic acid group in its molecule, namely it may be such compounds as alkyl sulfonic acid alkyl benzene sulfonic acid, alkyl naphthalene sulfonic acid, naphthalene disulfonic acid, antraquinone disulfonic acid, antraquinone sulfonic acid and the like as well as those derivatives.

In the process of preparation of polyaniline according to the present invention, it would be important that the oxidizing agent should be so selected that the byproduct produced from the reduction of the oxidizing agent in the oxidation process of aniline has a pKa value larger than a pKa value of sulfonic acid serving as the proton acid. Useful oxidizing agents may be potassium dichromate, sodium dichromate, ammonium dichromate, hydrogen peroxide, ferric sulfonic acid, cupric sulfonic acid, lead oxide. Particularly, dichromate is preferable as the oxidizing agent.

In the method of forming the solid electrolytic capacitor using polyaniline according to the present invention, useful anode metals may be tantalum, aluminium, niobium, titanium, zirconium, magnesium, silicon and the like. Such metals may be used as rolled foil, powdered sinter, etching material for rolled foil and the like.

In the fabrication process for the capacitor, the polymerization process is not so limited. Namely, the oxidizing agent or a mixture of the oxidizing agent with sulfonic acid compound is directly exposed to or made into contact with a gas or a solution of either aniline or the mixture of aniline and sulfonic acid compound. Alternatively, it would be available that they my be dissolved in a suitable solvent to be introduced into a porous pellet and thereafter exposed to or made into contact with the above gas or solution. Alternatively, it would also be available that either aniline or the mixture of aniline with sulfonic acid compound is introduced into the porous pellet of the anode metal and thereafter exposed to or made into contact with either the oxidizing agent or the mixture of the oxidizing agent with sulfonic acid compound.

After the polymerization, the product is washed by water or a soluble solvent to the oxidizing agent to remove the byproduct of the oxidizing agent which does not contribute to the conductivity and any excess proton acid. The method of removing the by product of the oxidizing agent is not limited to the above. For example, evaporation instated of washing and the other method are also available to remove the above. Although a complete removal of the oxidizing agent is not necessary, it is preferable to accomplish the complete removal thereof because none of or a small amount of the residual byproduct of the oxidizing agent improves properties in high frequency range and stability or heating. After the removal of the byproduct of the oxidizing agent, a dry of the product is accomplished for providing lead electrodes by the common method to assemble the capacitor. The above polymerization processes may be repeated.

Figure 1:
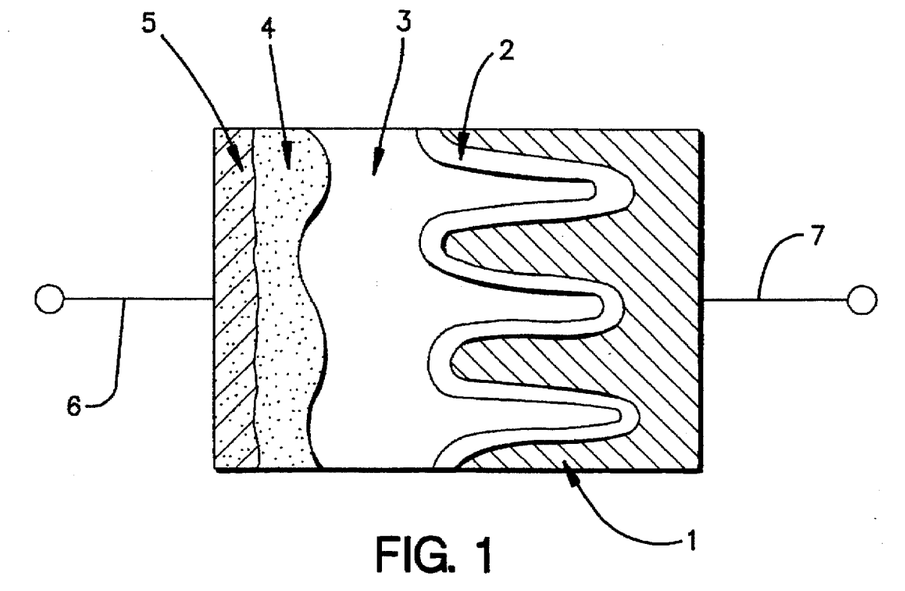
FIG. 1 is a sectional view illustrative of a solid electrolytic capacitor including a polyaniline prepared by the method according to the present invention.

FIG. 1 illustrates a solid electrolytic capacitor formed by the novel method according to the present invention. A metal anode 1 is prepared by etching thereof to form a great number of pores on a surface of the metal 1 so that an area of the surface is enlarged. A dielectric thin film 2 of oxide film of the metal is formed on the etched porous metal surface. A polyaniline layer 3 as solid electrolyte prepared by the above novel process according to the present invention is formed on the dielectric thin film 2 so that the polyaniline layer 3 fills the pores covered by the dielectric thin film. A graphite layer 4 is formed on the polyaniline layer 3. A metal electrode 5 is formed on the graphite layer 4. The graphite layer is provided to improve the adhesion of the metal paste layer 5 to the polyaniline layer 3. Leads are provided to the metal electrode 5 and the metal anode 1. A sealing process is finally accomplished to complete the fabrication process for the capacitor.

Figure 2:
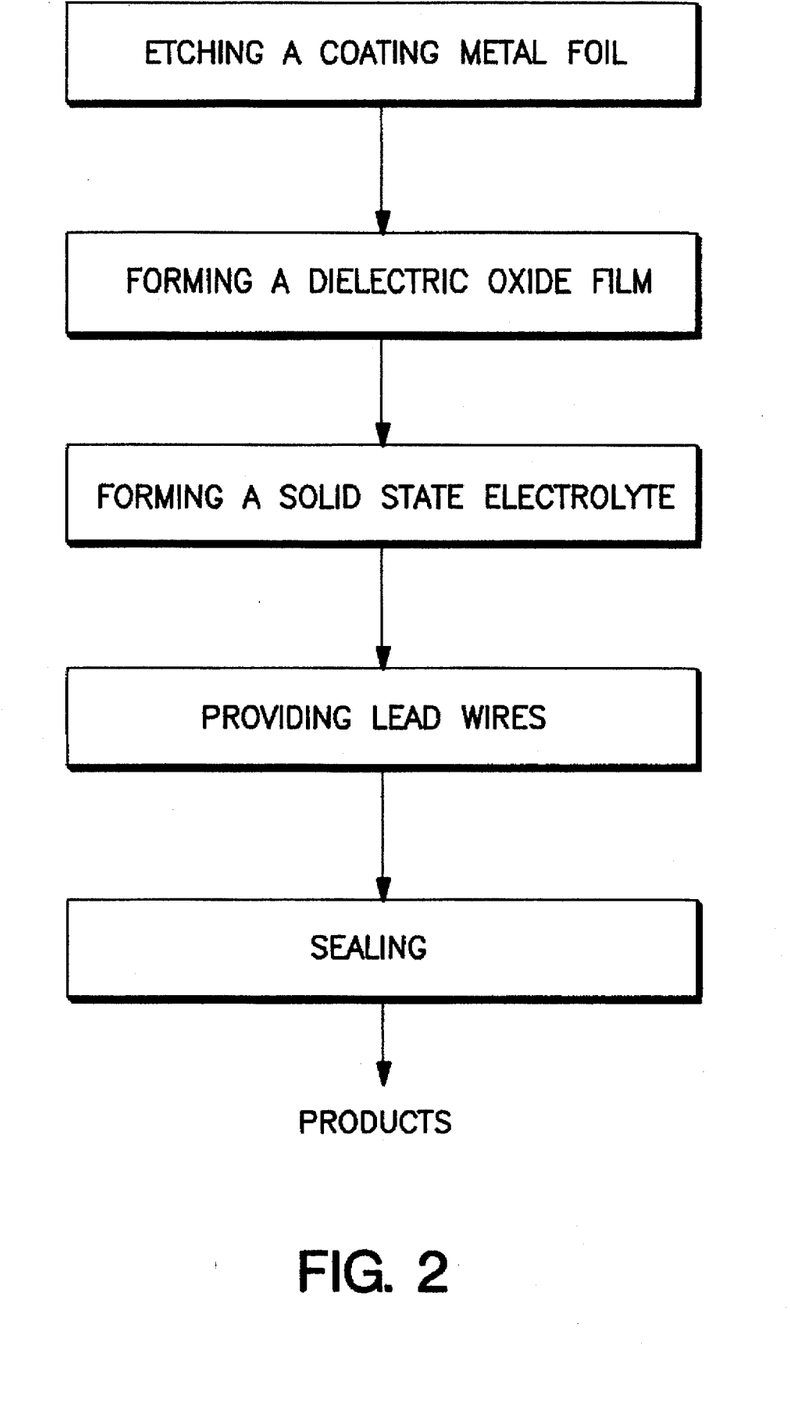
FIG. 2 is a flow chart describing a method for the formation of a solid state electrolytic capacitor including a polyaniline according to the present invention.

FIG. 2 is a flow chart of the above fabrication processes for the capacitor. As described above, the etching of the metal anode 1 is accomplished to form the pores on the surface of the metal anode 1. The formation of the dielectric thin film 2 on the surface of the porous metal 1 is accomplished. The polyaniline layer 3 as the solid electrolyte is subsequently formed on the dielectric thin film 2, to which the formation of the metal paste layer 5 may follow. The formation of the graphite layer 4 may be omitted as required. The leads are provided to the anode and cathode. The sealing process is final to complete the fabrication process of the capacitor.

It could be confirmed that in the polymerization process according to the present invention, the conductivity of the polyaniline may be increased by a heat treatment either in an inert gas having 10 mmHg or below as a partial pressure of oxygen or in vacuum without necessary of any acid treatment of the product or the capacitor. It could be found that a heat treatment at 120° C. or above in non-oxygen atmosphere makes the conductivity of the polyaniline rise. The value of the conductivity may be maximized up to three times of the initial value by the heat treatment for 10 minutes to 12 minutes and then the value is gradually reduced by any further heat treatment.

Figure 3:
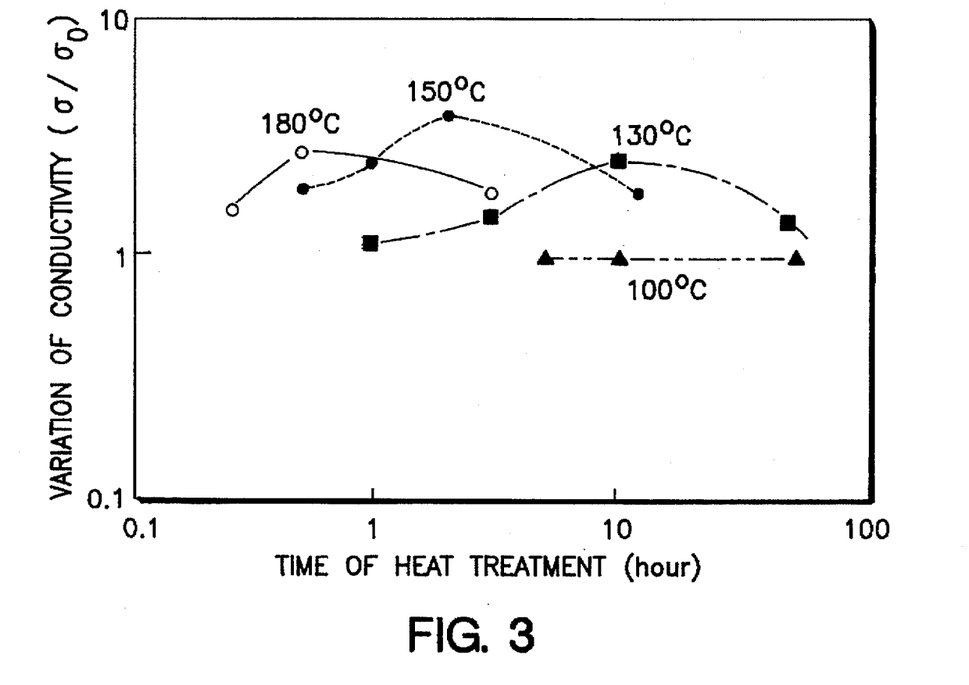
FIG. 3 is a diagram illustrative of variations in time of a conductivity of polyaniline which has been subjected to a heat treatment in a nitrogen atmosphere of a 5 mmHg partial pressure of oxygen.

FIG. 3 illustrates variations of the conductivity in time of the heat treatment under the conditions of 5 mmHg of an oxygen partial pressure in nitrogen atmosphere. From FIG. 3, it could be appreciated that a time necessary for maximization of the conductivity becomes short as the temperature of the heat treatment is high. Such rise of the conductivity appears under 10 mmHg or below of the oxygen partial pressure. In contrast, under more than 10 mmHg of the oxygen partial pressure, any heat treatment causes only the reduction of the conductivity. Although the oxygen pressure is below 10 mmHg, under a heat treatment at more than 200° C., no increase of the conductivity appears, and further under a heat treatment at more than 230° C. any reduction of the conductivity appears due to a decomposition of the polyaniline or the dopant doped from the polyaniline. The increase of the conductivity by the heat treatment of polyaniline may be on the ground of optimization of arrangement of the dopant by the heat treatment and a crystallization of polyaniline. Whereas it has generally be known that a heat treatment of polymers in an inert gas or vacuum at 800° C. or more causes a carbonization due to a chemical reaction with dehydrohenation of the polymer so that the polymer becomes conductive, the above is essentially different from the principal of the present invention. Such carbonization of polymer is applicable to improve the conductivity but which provides a poor property of a material of the electronics device.

According to the present invention, the heat treatment in the range of from 120° C. to 200° C. would be available. A heat treatment at about 150° C. is preferable to obtain a conductivity of two or three times of the initial conductive value before the heat treatment.

In the present invention, various types of the inert gas of 10 mmHg or below of the oxygen partial pressure or a vacuum is available, provided that oxygen content is 10 mmHg or less. For example, vacuum iner gases such as helium, neon, argon, krypton and xenon, nitrogen atmosphere and mixture gases thereof are available.

Such method of improving the conductivity is applicable to polyaniline. Not only the polyaniline prepared by the chemical polymerization using the oxidizing agent and the proton acid but also the polyaniline prepared by electrochemical polymerization are useful. Such polyaniline is useful in power, film or pellet prepared by compacting powder.

The structure of polyaniline was confirmed by IR spectrum of Shimadzu, IR-470 Infrared Spectrophotometer. Polyaniline powdered is compacted to form a pellet by a pressure of $4.5 \times 10^4$ ton/m$^2$ for measurement of the structure of polyaniline.

A measurement of the conductivity of polyaniline is made by four probes method on the pellet compacted by the pressure of $4.5 \times 10^4$ ton/m$^2$. with use of the above IR tablet. The measurement of the conductivity is made by applying a constant current from a power supply to the outside terminals and measuring a voltage between the inside terminals. The above measurement is made under a room temperature in vacuum.

The process of the preparation of polyaniline and the capacitor with the polyaniline electrolyte will be described in first to fifth examples.

(EXAMPLE 1)

4.2 g of paratoluene sulfonic acid and 80 ml of water are weighed and put into a flask of 200 ml to prepare a solution.

Stirring of the solution in the flask is accomplished with adding 2 g of aniline thereto. 20 ml of water is put into a cylindrical separatory funnel. A solution into which 1.8 g of ammonium dichromate and 9.1 g of paratoluene sulfonic acid are dissolved is prepared. The solution within the cylindrical separatory funnel is dropped in the aniline solution for two hours. The system temperature is kept at 0° C. or below by use of ice bath. After the drop of the solution, a further stirring of the reaction system is accomplished for 3 hours for polymerization.

After the polymerization, a product is subjected to filtration and subsequent washing by 1 l of water and 0.5 l of ethanol, followed by a dry treatment of the product.

Figure 4:
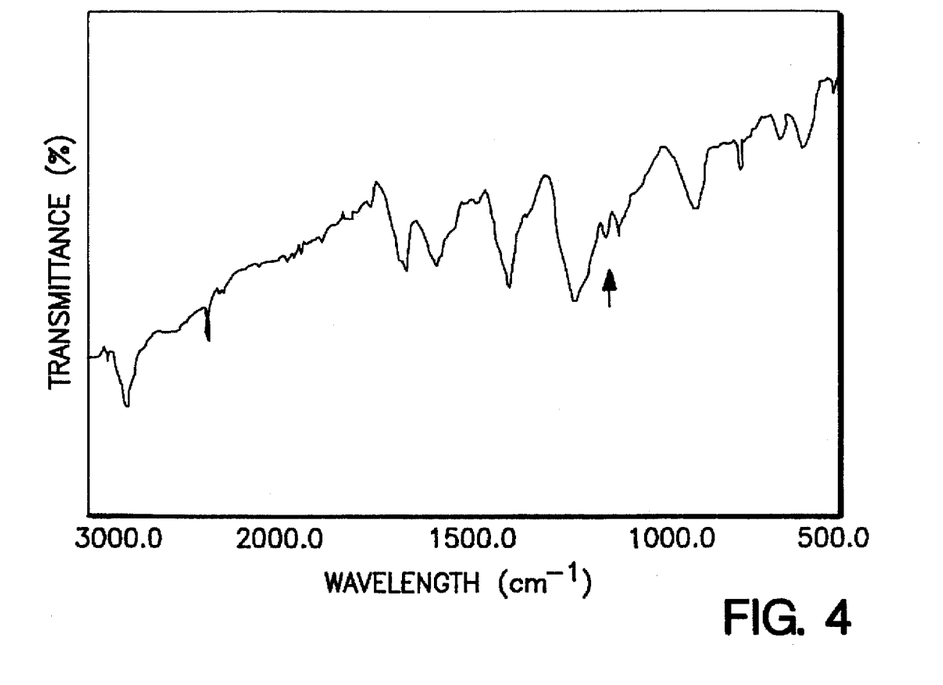
FIG. 4 is a diagram illustrative of IR spectrum of a polyaniline doped with a paratoluene sulfonic acid.

The IR spectrum of the polyaniline produced was observed as illustrated in FIG. 4 in which transmittance appears in the vertical axis and wavelength appears in the horizontal axis. It was observed that a characteristic absorption by doped polyaniline appears at a wavelength of 1120 $cm^{-1}$. Absorptions by a stretching vibration of S=0 of paratoluene sulfonic acid appears at a wavelength of 1000 $cm^{-1}$. From the above, it could be appreciated that a polyaniline doped with the dopant of paratoluene sulfonic acid is obtained. The polyaniline obtained has a conductivity of 0.35 S/cm.

(EXAMPLE 2)

5.8 g of alkyl naphthalene sulfonic acid and 80 ml of water are weighed and put into the flask of 200 ml to prepare a solution. Stirring of the solution in the flask is accomplished with adding 2 g of aniline thereto. 20 ml of water is put into the cylindrical separatory funnel. A solution into which 1.8 g of ammonium dichromate and 12.6 g of alkyl naphthalene sulfonic acid are dissolved is prepared. The solution within the cylindrical separatory funnel is dropped in the aniline solution for two hours. The reaction system temperature is kept at 0° C. or below by use of ice bath. After the drop of the solution, a further stirring of the reaction system is accomplished for 3 hours for polymerization.

After the polymerization, a product is subjected to filtration and subsequent washing by 1 l of water and 0.5 l of ethanol, followed by a dry treatment of the product.

The IR spectrum of the polyaniline produced was observed, which is similar to that as illustrated in FIG. 4 in which transmittance appears in the vertical axis and wavelength appears in the horizontal axis. A characteristic absorption by doped polyaniline and absorptions by a stretching vibration of alkyl naphthalene sulfonic acid were observed. From the above, it could be appreciated that a polyaniline doped with the dopant of alkyl naphthalene sulfonic acid is obtained. The polyaniline obtained has a conductivity of 0.27 S/cm.

(EXAMPLE 3)

4.2 g of paratoluene sulfonic acid and, a solvent of water and ethanol, a ratio of which is 1:1, are weighed and put into the flask of 200 ml. Stirring of the solution in the flask is accomplished with adding 2 g of aniline thereto. 20 ml of water is put into the cylindrical separatory funnel. A solution into which 1.8 of ammonium dichromate and 9.1 g of paratoluene sulfonic acid are dissolved is prepared. The solution within the cylindrical separatory funnel is dropped in the aniline solution for two hours. The reaction system temperature is kept at 0° C. or below by use of ice bath. After the drop of the solution, a further stirring of the reaction system is accomplished for 3 hours for polymerization.

After the polymerization, a product is subjected to filtration and subsequent washing by 1 l of water and 0.5 l of ethanol, followed by a dry treatment of the product.

The IR spectrum of the polyaniline produced was observed, which is similar to that as illustrated in FIG. 4 in which transmittance appears in the vertical axis and wavelength appears in the horizontal axis. A characteristic absorption by doped polyaniline and absorptions by a stretching vibration of paratoluene sulfonic acid were observed. From the above, it could be appreciated that a polyaniline doped with the dopant of paratoluene sulfonic acid is obtained. The polyaniline obtained has a conductivity of 0.25 S/cm.

(EXAMPLE 4)

4.2 g of paratoluene sulfonic acid and 80 ml of water are weighed and put into the flask of 200 ml to prepare a solution. Stirring of the solution in the flask is accomplished with adding 2 g of aniline thereto. 20 ml of water is put into the cylindrical separatory funnel. A solution into which 2.5 g of hydrogen peroxide and 4.5 g of paratoluene sulfonic acid are dissolved prepared. The solution is within the cylindrical separatory funnel is dropped in the aniline solution for two hours. The reaction system temperature is kept at 0° C. or below by use of ice bath. After the drop of the solution, a further stirring of the reaction system is accomplished for 3 hours for polymerization.

After the polymerization, a product is subjected to filtration and subsequent washing by 1 l of water and 0.5 l of ethanol, followed by a dry treatment of the product.

The IR spectrum of the polyaniline produced observed, which is similar to that as illustrated in FIG. 4 in which transmittance appears in the vertical axis and wavelength appears in the horizontal axis. A characteristic absorption by doped polyaniline and absorptions by a stretching vibration of paratoluene sulfonic acid were observed. From the above, it could be appreciated that a polyaniline doped with the dopant of paratoluene sulfonic acid is obtained. The polyaniline obtained has a conductivity of 0.11 S/cm.

(EXAMPLE 5)

4.2 g of paratoluene sulfonic acid and 80 ml of water are weighed and put into the flask of 200 ml to prepare a solution. Stirring of the solution in the flask is accomplished with adding 2 g of aniline thereto. 20 ml of water is put into the cylindrical separatory funnel. A solution into which 12.5 g of ferric paratoluene sulfonic acid is dissolved is prepared. The solution within the cylindrical separatory funnel is dropped in the aniline solution for two hours. The reaction system temperature is kept at 0° C. or below by use of ice bath. After the drop of the solution, a further stirring of the reaction system is accomplished for 24 hours for polymerization.

After the polymerization, a product is subjected to filtration and subsequent washing by 1 l of water and 0.5 l of ethanol, followed by a dry treatment of the product.

The IR spectrum of the polyaniline produced was observed, which is similar to that as illustrated in FIG. 4 in which transmittance appears in the vertical axis and wavelength appears in the horizontal axis. A characteristic absorption by doped polyaniline and absorptions by a stretching vibration of paratoluene sulfonic acid were observed. From the above, it could be appreciated that a polyaniline doped with the dopant of paratoluene sulfonic acid is obtained. The polyaniline obtained has a conductivity of 0.12 S/cm.

(Comparative Example 1)

4.2 g of paratoluene sulfonic acid and 80 ml of water are weighed and put into the flask of 200 ml to prepare a solution. Stirring of the solution in the flask is accomplished with adding 2 g of aniline thereto. 20 ml of water is put into the cylindrical separating funnel. A solution into which 5 g of ammonium peroxodisulfate is dissolved is prepared. The solution within the cylindrical separatory funnel is dropped in the aniline solution for two hours. The reaction system temperature is kept at 0° C. or below by use of ice bath. After the drop of the solution, a further stirring of the reaction system is accomplished for 3 hours for polymerization.

After the polymerization, a product is subjected to filtration and subsequent washing by 1 l of water and 0.5 l of ethanol, followed by a dry treatment of the product.

Figure 5:
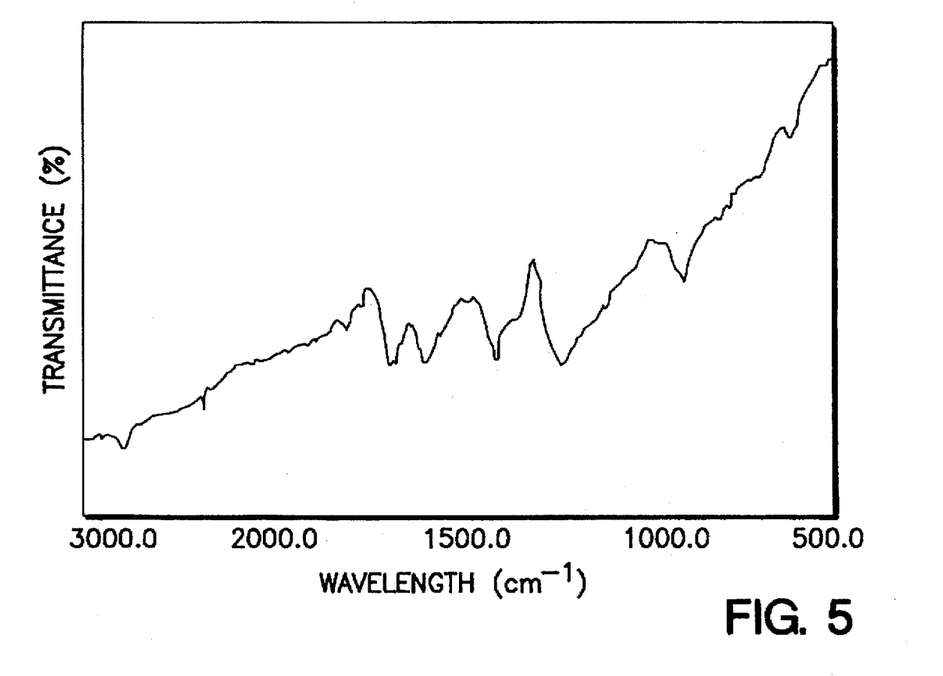
FIG. 5 is a diagram illustrative of IR spectrum of a polyaniline doped with either a sulfuric acid or a hydrochloric acid.

The IR spectrum of the polyaniline produced was observed as illustrated in FIG. 5 in which transmittance appears in the vertical axis and wavelength appears in the horizontal axis. A characteristic absorption by doped polyaniline appears at a wavelength of 1120 cm$^{-1}$ but no absorption by a stretching vibration of paratoluene sulfonic acid appears at wavelengths of 1030 cm$^{-1}$ and 1000 cm$^{-1}$. The polyaniline obtained has a conductivity of 0.31 S/cm.

(Comparative Example 2)

13.3 g of paratoluene sulfonic acid and 80 ml of water are weighed and put into the flask of 200 ml to prepare a solution. Stirring of the solution in the flask is accomplished with adding 2 g of aniline thereto. 20 ml of water is put into the cylindrical separatory funnel. A solution into which 3.6 g of ferric chloride is dissolved is prepared. The solution within the cylindrical separatory funnel is dropped in the aniline solution for two hours. The reaction system temperature is kept at 0° C. or below by use of ice bath. After the drop of the solution, a further stirring of the reaction system is accomplished for 3 hours for polymerization.

After the polymerization, a product is subjected to filtration and subsequent washing by 1 l of water and 0.5 l of ethanol, followed by a dry treatment of the product.

The IR spectrum of the polyaniline produced was observed, which is similar to that illustrated in FIG. 5 in which transmittance appears in the vertical axis and wavelength appears in the horizontal axis. A characteristic absorption by doped polyaniline appears at a wavelength of 1120 cm$^{-1}$ but no absorption by a stretching vibration of paratoluene sulfonic acid appears at wavelengths of 1030 cm$^{-1}$ and 1000 cm$^{-1}$. The polyaniline obtained has a conductivity of 0.17 S/cm.

The polyanilines prepared in the above examples and comparative examples are subjected to heat treatment in nitrogen atmosphere at 150° C. to evaluate the thermal stability thereof, the results of which are expressed in Table 1.

TABLE 1

| | Conductivity of Polyaniline after Heat Treatment | | |
|---|---|---|---|
| | Initial Value (S/cm) | 100 hr. (S/cm) | 200 hr. (S/cm) |
| Example 1 | 0.35 | 0.36 | 0.35 |
| Example 2 | 0.27 | 0.29 | 0.28 |
| Example 3 | 0.25 | 0.28 | 0.28 |
| Example 4 | 0.11 | 0.17 | 0.18 |
| Example 5 | 0.12 | 0.12 | 0.12 |
| Comp. Ex. 1 | 0.31 | $8.1 \times 10^{-2}$ | $1.3 \times 10^{-2}$ |
| Comp. Ex. 2 | 0.17 | $4.3 \times 10^{-2}$ | $7.2 \times 10^{-3}$ |

From Table 1, it could be appreciated that the polyaniline prepared in the embodiments according to the present invention have superior thermal stability rather than those prepared in the comparative examples.

The method of forming a solid electrolytic capacitor using polyaniline will be described in sixth to eleventh examples.

(EXAMPLE 6)

A fine tantalum powder is sintered to make a cylindrically shaped pellet having a diameter of 3 mm and a height of 3.5 mm. The tantalum pellet has a porosity of 60%. A nitric acid solution of 0.1 wt % is prepared. The tantalum pellet is anodized at a voltage of 120 V in the nitric acid solution and then subjected to washing and subsequent dry treatments. A solution including aniline and paratoluene sulfonic acid is prepared in which the ratio of water to ethanol is 1:1, the molar ratio of aniline to paratoluene sulfonic acid is 1:1 and the aniline concentration is 5 wt %. The tantalum pellet is immersed into the solution for 30 seconds at room temperature and then picked up to be placed in air. After 5 minutes, the pellet is immersed into a solution including an oxidizing agent of 20 wt % for 30 seconds in which a molar ratio of ammonium dichromate and paratoluene sulfonic acid is 1:3 and the solution is maintained at 0° C. The tantalum pellet is picked up to be placed in atmosphere for 10 minutes for polymerization. A washing and drying of the pellet is accomplished. A polyaniline of black color is formed on a surface of the dielectric layer.

The above processes, namely, filling of aniline, contacting with the solution of the oxidizing agent and paratoluene sulfonic acid, polymerization, washing and drying processes are repeated five times. The product is applied with silver paste and then provided with a lead of a cathode for a subsequent sealing with epoxy resin whereby the fabrication process for a solid state electrolytic capacitor is completed.

(EXAMPLE 7)

A fine tantalum powder is sintered to make a cylindrically shaped pellet having a diameter of 3 mm and a height of 3.5 mm. The tantalum pellet has a porosity of 60%. A nitric acid solution of 0.1 wt % is prepared. The tantalum pellet is anodized at a voltage of 120 V in the nitric acid solution and then subjected to washing and subsequent dry treatments. A solution including aniline and octyl benzene sulfonic acid is prepared in which the ratio of water to ethanol is 1:1, and aniline and octylbenzene sulfonic acid is 1:1, and the aniline concentration is 5 wt %. The tantalum pellet is immersed into the solution for 30 seconds at room temperature and then picked up to be placed in air. After 5 minutes, the pellet is immersed into a solution including an oxidizing agent of 20 wt % for 30 seconds in which the molar ratio of ammonium dichromate and octylbenzene sulfonic acid is 1:3 and the solution is maintained at 0° C. The tantalum pellet is picked up to be placed in air for 10 minutes for polymerization. A washing and drying of the pellet is accomplished. A polyaniline of black color is formed on a surface of the dielectric layer.

The above processes, namely filling of aniline, contacting with the solution of the oxidizing agent and octylbenzene sulfonic acid, polymerization, washing and drying processes are repeated five times. The product is applied with silver paste and then provided with a lead of a cathode for a subsequent sealing with epoxy resin whereby the fabrication process for a solid state electrolytic capacitor is completed.

(EXAMPLE 8)

A fine tantalum powder is sintered to make a cylindrically shaped pellet having a diameter of 3 mm and a height of 3.5 mm. The tantalum pellet has a porosity of 60%. A nitric acid solution of 0.1 wt % is prepared. The tantalum pellet is anodized at a voltage of 120 V in the nitric acid solution and then subjected to washing and subsequent dry treatments. A solution including aniline and butyl naphthalene sulfonic acid is prepared in which the ratio of water to ethanol is 1:1 and aniline and butyl naphthalene sulfonic acid is 1:1, and the aniline concentration is 5 wt %. The tantalum pellet is immersed into the solution for 30 seconds at room temperature and then picked up to be placed in air. After 5 minutes, the pellet is immersed into a solution including an oxidizing agent of 20 wt % for 30 seconds in which the molar ratio of ammonium dichromate and butyl naphthalene sulfonic acid is 1:3 and the solution is maintained at 0° C. The tantalum pellet is picked up to be placed in air for 10 minutes for polymerization. A washing and drying of the pellet is accomplished. A polyaniline of black color is formed on a surface of the dielectric layer.

The above processes, namely, filling of aniline, contacting with the solution of the oxidizing agent and butyl naphtha sulfonic acid, polymerization, washing and drying processes are repeated five times. The product is applied with silver paste and then provided with a lead of a cathode for a subsequent sealing with epoxy resin whereby the fabrication process for a solid state electrolytic capacitor is completed.

(EXAMPLE 9)

A fine tantalum powder is sintered to make into a cylindrically shaped pellet having a diameter of 3 mm and a height of 3.5 mm. The tantalum pellet has a porosity of 60%. The pellet is immersed into a solution including an oxidizing agent of 20 wt % for 30 seconds in which a molar ratio of ammonium dichromate and paratoluene sulfonic acid is 1:3 and the solution is maintained at 0° C. A solution is prepared in which a ratio of water to ethanol is 1:1, and a molar ratio of aniline to paratoluene sulfonic acid is 1:1 and the aniline concentration is 5 wt %. After 10 minutes, the tantalum pellet is immersed into the solution for 30 seconds at room temperature and then picked up to be placed in air. The tantalum pellet is picked up to be placed in air for 10 minutes for polymerization. A washing and drying of the pellet is accomplished. A polyaniline of black color is formed on a surface of the dielectric.

The above processes, namely, filling of aniline, contacting with the solution of the oxidizing agent and paratoluene sulfonic acid, polymerization, washing and drying processes are repeated in five times. The product is applied with silver paste and then provided with a lead of a cathode for a subsequent sealing with epoxy resin thereby fabrication processes for a solid state electrolytic capacitor is completed.

(EXAMPLE 10)

A fine tantalum powder is sintered to make compacted and made into a cylindrically shaped pellet having a diameter of 3 mm and a height of 3.5 mm. The tantalum pellet has a porosity of 60%. A nitric acid solution of 0.1 wt % is prepared. The tantalum pellet is anodized at a voltage of 120 V in the nitric acid solution and then subjected to washing and subsequent dry treatments. A solution including aniline and paratoluene sulfonic acid is prepared in which a ratio of water to ethanol is 1:1, a molar ratio of aniline to paratoluene sulfonic acid is 1:1 and the aniline concentration is 5 wt %. The tantalum pellet is immersed into the solution for 30 seconds at room temperature and then picked up to be placed in air. After 5 minutes, the pellet is immersed into a solution including an oxidizing agent of 20 wt % for 30 seconds in which a molar ratio of hydrogen peroxide and paratoluene sulfonic is 1:3 and the solution is maintained at 0° C. The tantalum pellet is picked up to be placed in atmosphere for 10 minutes for polymerization. A washing and drying of the pellet is accomplished. A polyaniline of black color is formed on a surface of the dielectric layer.

The above processes, namely, filling of aniline, contacting with the solution of the oxidizing agent and paratoluene sulfonic acid, polymerization, washing and drying processes are repeated in five times. The product is applied with silver paste and then provided with a lead of a cathode for a subsequent sealing with epoxy resin whereby the fabrication process for a solid state electrolytic capacitor is completed.

(EXAMPLE 11)

A foil of aluminium having a thickness of 150 micrometers and a 1×0.5 cm$^2$ size is subjected to etching to expand the surface area of the foil about twenty times. The aluminum foil is anodized at a voltage of 100 V in an 5 wt % ammonium boric acid solution and then subjected to washing and subsequent dry treatments. A solution including aniline and paratoluene sulfonic acid is prepared in which the ratio of water to ethanol is 1:1, the molar ratio of aniline to paratoluene sulfonic acid is 1:1, and the aniline concentration is 5 wt %. The tantalum pellet is immersed into the solution for 30 seconds at room temperature and then picked up to be placed in air. After 5 minutes, the pellet is immersed into a solution including an oxidizing agent of 20 wt % for 30 seconds in which the molar ratio of ammonium dichromate and paratoluene sulfonic acid is 1:3 and the solution is maintained at 0° C. The tantalum pellet is picked up to be placed in air for 10 minutes for polymerization. A washing and drying of the pellet is accomplished. A polyaniline of black color is formed on a surface of the dielectric.

The above processes, namely, filling of aniline, contacting with the solution of the oxidizing agent and paratoluene sulfonic acid, polymerization, washing and drying processes are repeated five times. The product is applied with silver paste and then provided with a lead of a cathode for a subsequent sealing with epoxy resin whereby the fabrication process for a solid state electrolytic capacitor is completed.

(Comparative Example 3)

A fine tantalum powder is sintered to make into a cylindrically shaped pellet having a diameter of 3 mm and a height of 3.5 mm. The tantalum pellet has a porosity of 60%. A nitric acid solution of 0.1 wt % is prepared. The tantalum pellet is anodized at a voltage of 120 V in the nitric acid solution and then subjected to washing and subsequent dry treatments. A solution including aniline and paratoluene sulfonic acid is prepared in which the ratio of water to ethanol is 1:1, the and a molar ratio of aniline to paratoluene sulfonic acid is 1:1 and the aniline concentration is 5 wt %. The tantalum pellet is immersed into the solution for 30 seconds at room temperature and then picked up to be placed in air. After 5 minutes, the pellet is immersed into a solution including an oxidizing agent of 20 wt % for 30 seconds in which the molar ratio of ferric chloride and paratoluene sulfonic acid is 1:3 and the solution is maintained at 0° C. The tantalum pellet is picked up to be placed in atmosphere for 10 minutes for polymerization. A washing and drying of the pellet is accomplished. A polyaniline of black color is formed on a surface of the dielectric.

The above processes, namely, filling of aniline, contacting with the solution of the oxidizing agent and paratoluene sulfonic acid, polymerization, washing and drying processes are repeated five times. The product is applied with silver paste and then provided with a lead of a cathode for a subsequent sealing with epoxy resin whereby the fabrication process for a solid state electrolytic capacitor is completed.

After the completion of the above processes, measurements of the a normalized capacitance ($C/C_0$), a leakage current (LC) and an impedance (R) at a resonant frequency are made where the $C_0$ is the capacitance in an electrolytic solution. The leakage current is measured at a voltage of 40 V. Further, after a heat treatment at 150° C. for 100 hours of the capacitor, the above the normalized capacitance ($C/C_0$), the leakage current (LC) and the impedance (R) are measured. The results of the measurements are shown in Table 2.

TABLE 2

Normalized Capacitance ($C/C_0$), Leakage Current (LC) and Impedance (R) at Resonant Frequency

|  |  | $C/C_0$ (%) | LC (nA) | R (m$\Omega$) |
| --- | --- | --- | --- | --- |
| Example 6 | (no heat treatment) | 98 | 76 | 83 |
|  | (heat treatment) | 101 | 81 | 81 |
| Example 7 | (no heat treatment) | 102 | 77 | 98 |
|  | (heat treatment) | 93 | 88 | 97 |
| Example 8 | (no heat treatment) | 97 | 87 | 101 |
|  | (heat treatment) | 98 | 90 | 110 |
| Example 9 | (no heat treatment) | 105 | 120 | 89 |
|  | (heat treatment) | 99 | 145 | 92 |
| Example 10 | (no heat treatment) | 82 | 89 | 130 |
|  | (heat treatment) | 80 | 92 | 142 |
| Example 11 | (no heat treatment) | 107 | 77 | 87 |
|  | (heat treatment) | 98 | 81 | 85 |
| Comp. Ex. 3 | (no heat treatment) | 97 | 235 | 86 |
|  | (heat treatment) | 83 | 324 | 473 |

From Table 2, it could be appreciated that the capacitor prepared in each of the above sixth to eleventh examples shows a smaller impedance at the resonant frequency. Namely, the capacitors prepared in the above examples possess an excellent high frequency performance. The capacitor of the embodiment shows almost no inferiority in properties under a high temperature of 150° C. and thus has a superior heat stability as compared to that prepared in the comparative example 3.

Methods of preparing a polyaniline having an improved conductivity will be described in Examples 12 to 14.

(EXAMPLE 12)

Aniline is dissolved in a paratoluene sulfonic acid solution. A polymerization of the aniline following the method as in Example 1 is accomplished at a temperature of 0° C. with use of ammonium dichromate as the oxidizing agent whereby a polyaniline powder doped with paratoluene sulfonic acid is obtained. The polyaniline powder is then pressed to be made into a pellet. The polyaniline pellet has a conductivity of 0.35 S/cm. The polyaniline pellet is subjected to a heat treatment at a temperature of 150° C. under a partial pressure of oxygen of 5 mmHg in a nitrogen atmosphere for two hours whereby the conductivity is improved to 1.1 S/cm.

(EXAMPLE 13)

Aniline is dissolved in a paratoluene sulfonic acid solution. A polymerization of the aniline following the method as in Example 1 is accomplished at a temperature of 0° C. with use of ammonium dichromate as the oxidizing agent thereby a polyaniline powder doped with paratoluene sulfonic acid is obtained. The polyaniline powder is then pressed to be made into a pellet. The polyaniline pellet has a conductivity of 0.35 S/cm. The polyaniline pellet is subjected to a heat treatment at a temperature of 180° C. under a partial pressure of oxygen of 5 mmHg in a nitrogen atmosphere for 30 minutes whereby the conductivity is improved to 0.81 S/cm.

(EXAMPLE 14)

Aniline is dissolved in a paratoluene sulfonic acid solution. A polymerization of the aniline following the method as in Example 1 is accomplished at a temperature of 0° C. with use of ammonium dichromate as the oxidizing agent whereby a polyaniline powder doped with paratoluene sulfonic acid is obtained. The polyaniline powder is then pressed to be made into a pellet. The polyaniline pellet has a conductivity of 0.35 S/cm. The polyaniline pellet is subjected to a heat treatment at a temperature of 130° C. under a partial pressure of oxygen of 5 mmHg in a nitrogen atmosphere for 10 hours whereby the conductivity is improved up to 0.77 S/cm.

(Comparative Example 4)

Aniline is following the method as in Example 1 in a paratoluene sulfonic acid solution. A polymerization of the aniline dissolved is accomplished at a temperature of 0° C. with use of ammonium dichromate as the oxidizing agent thereby a polyaniline powder doped with paratoluene sulfonic acid is obtained. The polyaniline powder is then pressed to be made into a pellet. The polyaniline pellet has a conductivity of 0.35 S/cm. The polyaniline pellet is subjected to a heat treatment at a temperature of 100° C. under a partial pressure of oxygen of 5 mmHg in a nitrogen atmosphere for 50 hours whereby the conductivity is changed to 0.33 S/cm. Almost no improvement in the conductivity is obtained.

(Comparative Example 5)

Aniline is dissolved in a paratoluene sulfonic acid solution. A polymerization of the aniline following the method as in Example 1 is accomplished at a temperature of 0° C. with use of ammonium dichromate as the oxidizing agent whereby a polyaniline powder doped with paratoluene sulfonic acid is obtained. The polyaniline powder is then pressed to be made into a pellet. The polyaniline pellet has a conductivity of 0.35 S/cm. The polyaniline pellet is subjected to a heat treatment at a temperature of 230° C. under a partial pressure of oxygen of 5 mmHg in a nitrogen atmosphere for 30 minutes whereby the conductivity is lowered to 0.031 S/cm. The conductivity becomes inferior.

(Comparative Example 6)

Aniline is dissolved in a paratoluene sulfonic acid solution. A polymerization of the aniline following the method as in Example 1 is accomplished at a temperature of 0° C. with use of ammonium dichromate as the oxidizing agent whereby a polyaniline powder doped with paratoluene sulfonic acid is obtained. The polyaniline powder is then pressed to be made into a pellet. The polyaniline pellet has a conductivity of 0.35 S/cm. The polyaniline pellet is subjected to a heat treatment at a temperature of 150° C. under a partial pressure of oxygen of 200 mmHg in a nitrogen atmosphere for two hours whereby the conductivity is lowered to 0.00023 S/cm. The conductivity becomes inferior remarkably.

What is claimed is:

1. A process for forming a solid electrolytic capacitor comprising the steps of:

forming a dielectric film on a first electrode;

forming a polyaniline on said dielectric film as an electrolyte prepared by an oxidation polymerization of aniline by use of not only an oxidizing agent of ammonium dichromate but also a protonic acid comprising paratoluene sulfonic acid, wherein the pKa value of a byproduct produced by the reduction of said oxidizing agent is greater than the pKa value of said protonic acid, said byproduct being an anion serving as a dopant to said polyaniline and each said pKa value being a dissociation constant; and providing a second electrode on said polyaniline.

2. The process as claimed in claim 1, wherein the molar ratio of ammonium dichromate to paratoluene sulfonic acid is 1:3.

* * * * *